May 6, 1941.                J. VISSER                2,241,045
                            RECEPTACLE
                      Filed March 29, 1935          2 Sheets-Sheet 1
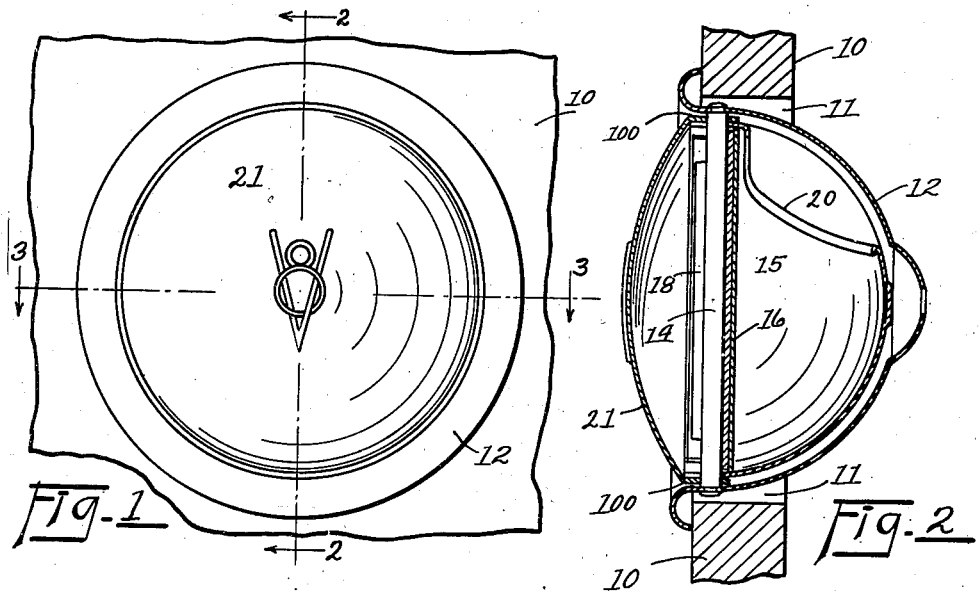
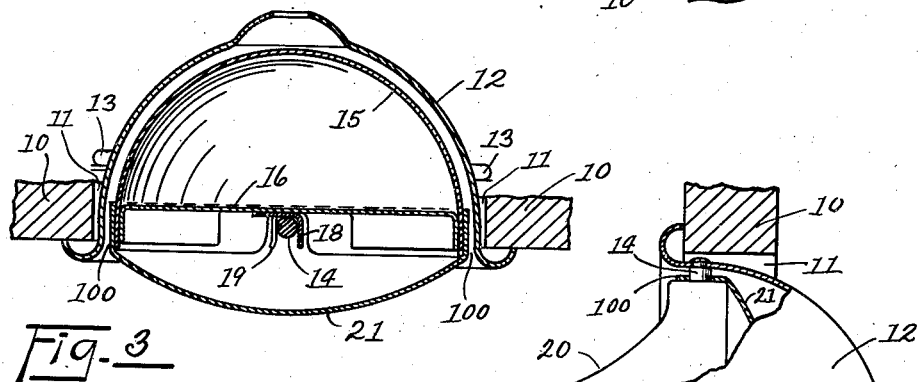
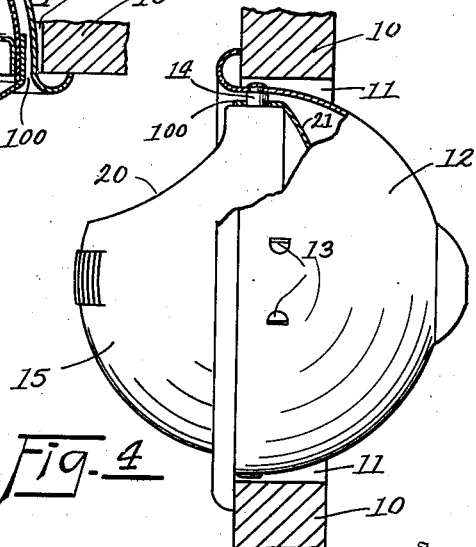
Inventor
John Visser May 6, 1941.   J. VISSER   2,241,045
RECEPTACLE
Filed March 29, 1935   2 Sheets-Sheet 2
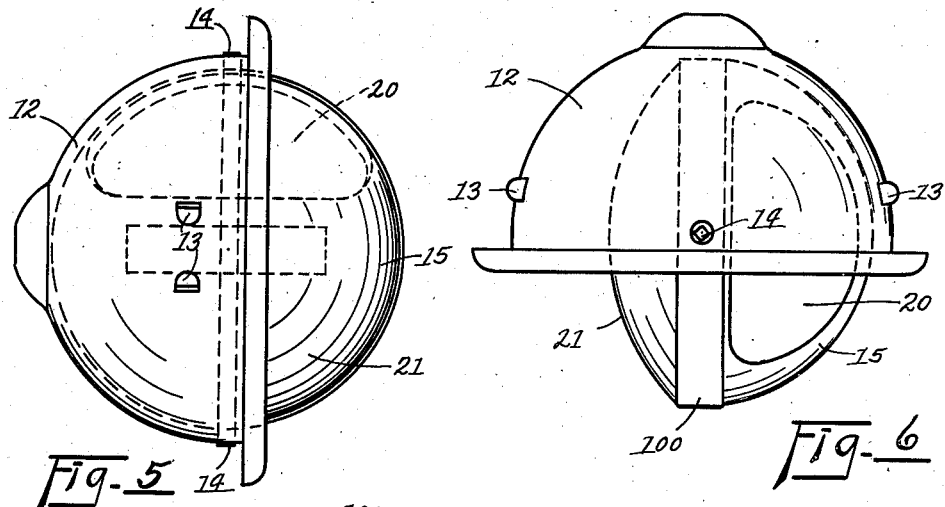
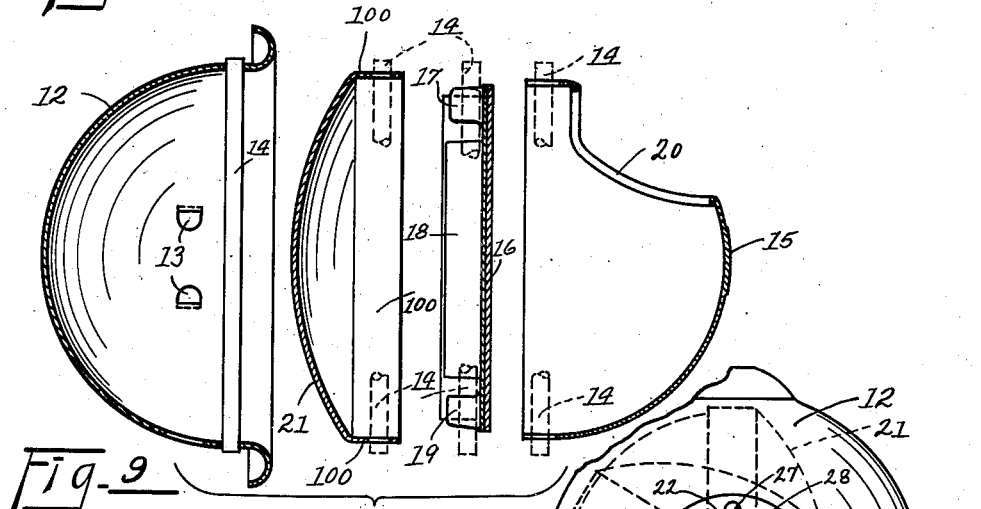
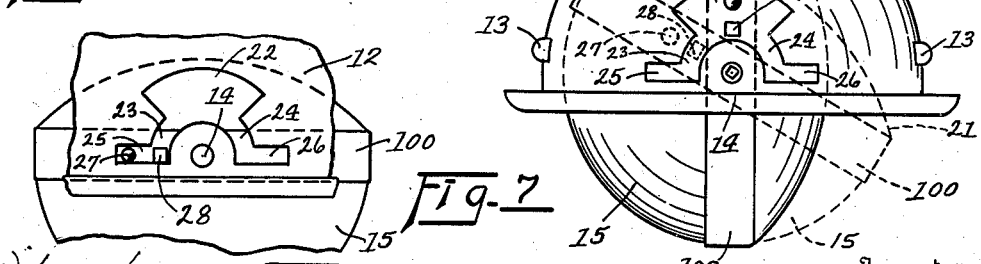
John Visser Patented May 6, 1941

2,241,045

UNITED STATES PATENT OFFICE 2,241,045

RECEPTACLE

John Visser, Grand Rapids, Mich., assignor, by mesne assignments, to Reconstruction Finance Corporation, Detroit, Mich., a corporation of the United States Application March 29, 1935, Serial No. 13,688

7 Claims. (Cl. 206—19.5)

The instant invention relates to receptacles and more particularly to removably mounted receptacles adapted for mounting within the interior of a motor vehicle.

The primary objects of the present invention are to provide a device of the general character above indicated which is particularly adapted for use as an ash receiver; to provide such a device having a base plate and container housing which may be readily secured within the interior of a motor vehicle; to provide such a device whose ash receiving container may be conveniently attached to and readily removed from its housing; to provide such a device whose ash receiving container may be rotated into and out of its housing; and, to provide such a device which may be economically manufactured from stamped sheet metal, which is attractive in appearance and which is utilitarian in use.

An illustrative embodiment of the invention is shown in the accompanying drawings, wherein:

Figure 1 is a front elevational view of the device shown as mounted upon a panel such as the dash board of a motor vehicle;

Figure 2 is a sectional view thereof on line 2—2 of Figure 1;

Figure 3 is a sectional view on line 3—3 of Figure 1;

Figure 4 is a side elevational view of the device showing the ash receiving container swung out of its housing to open position for use, a portion of the housing being broken away;

Figure 5 is a side elevational view of the device similar to that shown in Figure 4 but showing the reverse side of the container swung a quarter turn out of its housing;

Figure 6 is a top plan view of the device showing the ash receiving container swung a quarter turn;

Figure 7 is a bottom plan view of the device showing in full lines the ash receiving container swung a quarter turn and in dotted lines the ash receiving container is shown as further swung outwardly;

Figure 8 is a fragmentary bottom plan view showing the ash receiving container swung outwardly a half turn; and Figure 9 is a view of the several parts before their assembly.

Referring to the drawings in which like parts of the device there shown are designated by the same numerals in the several views, an interior wall of a motor car such as a dash panel 10 thereof is provided with an opening 11 therethrough within which is mounted a semi-spherical shell 12, preferably of stamped and drawn sheet metal, secured within the opening in any convenient manner as by the fins 13 and forming a housing. This housing is provided with a pintle 14, here shown as vertically disposed forwardly and medially of the width of the housing, and whose heads are preferably riveted to the outer walls of the housing shell.

A semi-spherical ash receiving container 15, likewise preferably of stamped and drawn sheet metal, is preferably provided with a stamped metal back plate 16 which is secured thereto and which has staggered spring tensioned fingers 17, 18, 19 adapted to removably embrace the pintle 14, thus adapting the container 15 for manual rotation into and out of the housing 12 as from the closed position shown in Figure 2 to the open position shown in Figure 4.

The container 15 is provided with an opening 20 permitting disposition of ashes and the like therethrough and into the container 15. Since the container may be bodily removed from its housing 12, ashes may be discarded therefrom from time to time and as the occasion may require.

The back plate 16 preferably telescopes with an ornamental stamped and drawn face plate 21 rotatable on the pintle and which when the ash receiving container 15 is swung from the open position shown in Figure 4 to the closed position shown in Figure 2 will swing with the container and present the attractive appearance shown in Figure 1.

The shell 12 forming the housing for the ash receiving container 15 is likewise preferably provided with an arcuate slot circumscribing the pintle and best shown in Figures 7 and 8. This slot has a widened portion 22 medially of its length, a narrower portion 23, 24 on opposite sides of the medial portion and widened portions 25, 26 on opposite sides of the narrow portions. The face plate 21 on the outer surface of its peripheral flange 100 is provided with a pair of spaced studs 27, 28, both of which are freely movable within the medial widened portion 22 of the slot during the rotation of the ash receiving container 15 and its face plate 21, the stud 28 likewise being freely movable in the narrow portions 23, 24 of the slot during such rotation and acting as a stop, all as best shown in Figures 7 and 8. The stud 27 however rides under the under surface of the shell opposite the narrow portions 23, 24 of the slot and snaps into either of the widened ends thereof in the opposite rotations of the ash receiving container 15 to retain the ash receiving container in either open or closed position.

It will thus be seen that the device of the instant invention may be readily secured within the interior of a motor vehicle for use as an ash receiver, that the ash receiving container thereof may be conveniently attached and readily removed from its housing and that the device may be economically manufactured, is utilitarian in use and attractive in appearance.

While but one specific embodiment of this invention has been herein shown and described, it will be understood that numerous details of the construction shown may be altered or omitted without departing from the spirit of this invention as defined by the following claims.

I claim:

1. In a device of the class described, a semi-spherical shell forming a housing and provided with a pintle, and a semi-spherical container detachably mounted upon the pintle and rotatable into and out of the housing, said container having resilient clip means extending rearwardly therefrom and having a detachable snap-on engagement with said pintle.

2. In a device of the class described, a semi-spherical shell forming a housing and provided with a pintle extending across the same, and a semi-spherical container having a back plate provided with a spring tensioned means removably engaging the pintle and adapting the container for rotation into and out of the housing.

3. In a device of the class described, a semi-spherical shell forming a housing and provided with a pintle, and a semi-spherical container having a back plate yielding frictional mounting means attached to said back plate constructed and arranged so that said container may be removably snapped into engagement with said pintle for rotation into and out of the housing.

4. In a device of the class described, a semi-spherical shell forming a housing and provided with a pintle extending across the opening of said shell, and a semi-spherical container having a back plate apertured to removably embrace the pintle and said pintle providing for the rotation of said container into and out of the housing, said back plate having a face plate.

5. In a device of the class described, a housing having a pintle and provided with an arcuate slot circumscribing the pintle, said slot being widened medially of its length and at its opposite ends, and a member mounted upon the pintle and rotatable into and out of the housing, said member having a stud adapted to freely move within the widened medial portion of the arcuate slot during the rotation of the member into and out of the housing and to snap into either of the widened ends of the slot in the opposite rotations of said member for retaining the member in either of its oppositely rotated positions.

6. In a device of the class described, a housing having a pintle and provided with an arcuate slot circumscribing the pintle, said slot being widened medially of its length and at its opposite ends, and a member mounted upon the pintle and rotatable into and out of the housing, said member having a pair of spaced studs adapted to freely move within the widened medial portion of the arcuate slot during the rotation of the member into and out of the housing, one of said studs being likewise freely movable within the narrow portions of said slot and acting as a stop and the other of said studs snapping into either of the widened ends of the slot in the opposite rotations of said member for retaining the member in either of its oppositely rotated positions.

7. An article of the class described comprising, a container support having a decoratively finished surface, a container supported within the container support with said container spaced from the portion of the container support having the decorative surface.

JOHN VISSER.